Nov. 29, 1927.
J. A. ANDERSON
AUTOMATIC TAKE-UP BOLT
Filed Nov. 26, 1926
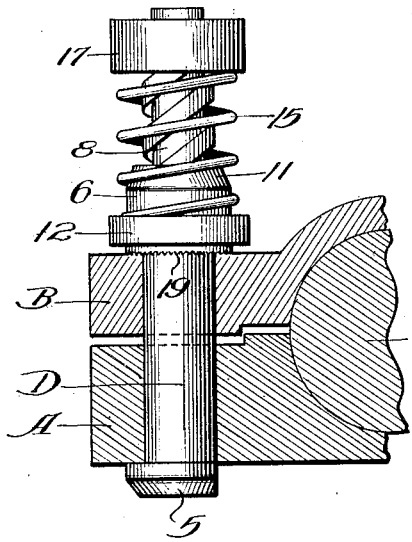
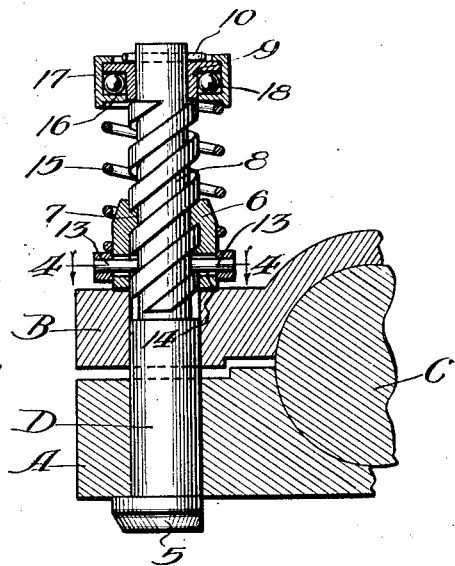
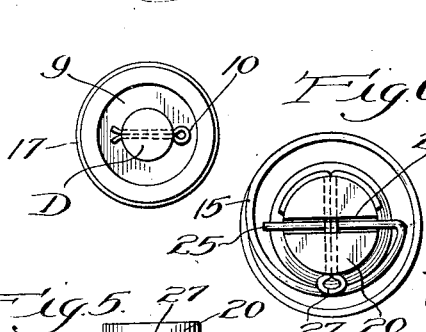
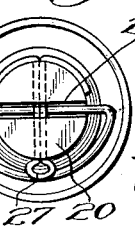
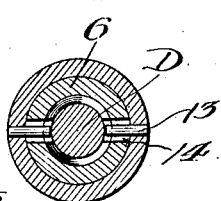
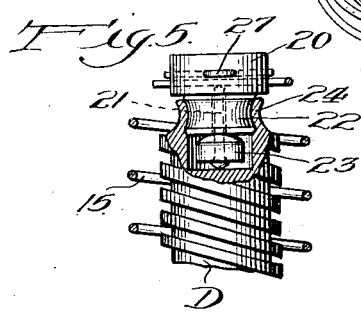
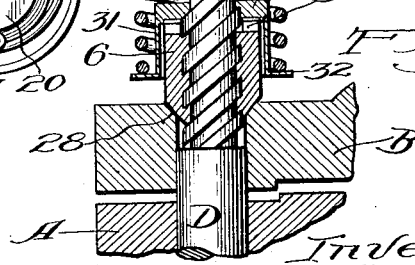
Inventor:
John A. Anderson Patented Nov. 29, 1927.

1,651,240

UNITED STATES PATENT OFFICE.

JOHN A. ANDERSON, OF GENESEO, ILLINOIS, ASSIGNOR TO BARTLETT S. GRAY, TRUSTEE, OF GENESEO, ILLINOIS.

AUTOMATIC TAKE-UP BOLT.

Application filed November 26, 1926. Serial No. 150,880.

This invention relates to a bolt having a nut with which is associated means for effecting automatically an advance thereof, whenever conditions will permit, whereby to take up any play or slack occasioned through wear or use of the parts connected by the bolt. It may be employed advantageously for many purposes, and particularly so in connection with a split bearing such as is commonly used in engines of various kinds. In the description to follow reference will be made to the present bolt in relation to a conventional split bearing, although, as above suggested, it may be applied to other uses as well.

It is an object of my invention to provide in a bolt of the character described simple and effective means which will act automatically to advance the nut to compensate for wear in the parts with which the bolt is associated. It is desirable that such a nut be freely rotatable to different positions of adjustment, and that it should not recede therefrom in response to thrusts of any kind. Split bearings are commonly employed with connecting rods which are secured to engine cranks, the tendency being with each reciprocation of such a rod to impose a thrust upon the head of the bolt or its associated nut. According to my invention, effective means are provided for preventing any reverse movement or end play of the nut upon the bolt threads whereon it is mounted, with the result that the nut and bolt head continue to exert an even pressure upon the associated parts at all times.

It is with objects such as these that the present improvements are concerned. Other advantages are also derived from my invention as will be pointed out hereinafter in the specification and claims.

An embodiment of my invention is set forth in the accompanying drawing in the manner following:

Figure 1 is a side elevation of a take-up bolt shown as applied to a split bearing of which a portion is illustrated in cross section;

Fig. 2 is a similar view with the exception that the nut and associated elements on the bolt are shown in cross section;

Fig. 3 is a top plan view of the bolt;

Fig. 4 is a transverse section therethrough taken on line 4—4 of Fig. 2;

Fig. 5 is a detail, partly in elevation and partly in section, of one end of a take-up bolt having a modified construction;

Fig. 6 is a plan view of the bolt shown in Fig. 5; and

Fig. 7 which is a detail in elevation shows a nut of modified form.

As illustrative of one use to which my take-up bolt may be applied, I have shown in the drawing two bearing members A and B which may be carried on a connecting rod (not shown) in surrounding relation to a crank pin C. Between the two bearing members is a slight space which tends to decrease with wear. These members are connected together by means of one or more bolts D with which may be associated the automatic take-up mechanism now to be described.

A head 5 provided upon one end of the bolt engages with one bearing member. Co-operating with the head is a nut 6 engaging with the other bearing part, and provided internally with threads 7 which co-operate with other threads 8 formed on the bolt. These threads are by preference rather steep, a suggestive pitch being perhaps 20 or 22½ degrees, whereby the nut may be rotatively advanced in response to an end pressure exerted by any suitable means. The threads extend for a desired distance along the bolt and terminate remote from one end thereof whereon is mounted a sleeve 9 held in place, if desired, by a cotter pin 10 which is extended transversely through the bolt.

The nut end which is remote from the bearing is preferably coned as at 11. Surrounding the nut is a collar 12 which carries a pair of pins 13 extended diametrically through slots 14 in the nut to present their inner ends against the bolt between the threads 8 thereof. A compression spring 15 surrounds the bolt, one end of the spring bearing against the nut collar, and the other against a flange 16 extending inwardly from a ring 17 which is carried by the sleeve 9. This ring which is loosely mounted for rotation about the sleeve may be separated therefrom by anti-friction members such as balls 18 (see Fig. 2). According to this construction the ring is freely rotatable around the bolt end so that there is no occasion for slip between this part and the spring 15 whenever the latter is permitted to expand in response to advancement of the nut.

The screw threads 8 which are provided on the bolt are preferably square cut, as shown. Likewise the inwardly extending threads 7 of the nut are of similar form. Although these threads may be designed to co-operate without longitudinal play, in the use to which a take-up bolt is usually subjected an appreciable wear soon develops such that end play follows. This is very undesirable for the reason that the nut may then play upon the bolt, with the result that the position of the bearing members is variable relative to the associated crank pin. To overcome this defect, I provide the pins 13 whose inner ends engage with the body of the bolt between the threads 8 thereof. These pins which are carried by the collar 12 may shift slightly within the slots as required, for constant engagement with one face of the bolt threads 8—the upper face as viewed in the drawing. The nut threads 7, on the other hand, bear against the under face of the bolt threads in response to pressure from the bearing members. By the means described, opposing pressures upon opposite faces of the bolt threads are exerted by the pins 13 and nut threads 7 so as to obviate all possibility of end play between the nut and the bolt upon which it is mounted.

It is to be noted furthermore that whenever the nut is rotatably advanced upon the bolt to take up wear, the spring 15 and ring 17 is rotated therewith. By the use of anti-friction members 18, it is possible to reduce to a minimum the friction which results from movement of the ring upon the bolt.

A satisfactory operation may possibly be obtained otherwise, however, as will appear hereinafter by reference to Figures 5 and 6, so that I do not wish to be limited to a structure in which anti-friction members are employed. The important thing is that the spring thrust is exerted against a part which is freely rotatable upon the bolt so as to turn around with the spring as it expands.

The present bolt when installed upon a traveling bearing, such as is present in one end of a connecting rod is moved about in a path which develops forces of momentum in the direction of its own axis. The effect of this is a tendency alternately to advance and release the nut relative to the associated bearing. The advancement is enhanced by pressure from the spring 15 which serves also to resist retraction of the nut. It may be desirable to augment the opposing force of this spring by serrating as at 19 the bearing face of the nut whereby it may engage the proximate bearing member B with greater friction. In some such manner as this I provide against a reactive loosening of the nut.

In Fig. 5 is set forth a generally similar construction differing only in the ring at the bolt end. A head 20 is used instead, this being provided with a depending pin 21 which extends loosely through a thimble 22 for connection with a button 23 having by preference a convex or cone-shaped upper end for engagement with the thimble. In the bolt end is a socket wherein is secured the button and thimble, the bolt walls, as at 24, being inwardly bent to secure the thimble in place. The spring 15 in this construction may have one end 25 inturned for passage through a transverse slot 26 in the head 20 where it is secured by an overlying pin 27 passing through a second transverse opening in the head. By this construction I provide a freely rotatable mounting for the head such that it may turn easily in response to expansion of the spring 15.

It may also be found desirable to utilize a nut construction such as is suggested in Fig. 7. In this case the nut 6 is coned at its bearing end to engage within a tapered seat 28 in the work B, an increased friction between these parts being the result. In lieu of a collar with thread-engaging pins, as heretofore described, I may employ a different form of thread-engaging collar 29 having lugs or teeth 30 which interengage with co-operating elements on the proximate nut end so as to lock therewith when positioned as shown in Fig. 7. This collar is further provided with a depending support 31 whereon is carried an outturned flange 32 against which one end of the spring 15 exerts pressure. The operation of such a nut, when assembled with other components such as has already been described, is substantially the same as hereinbefore set forth.

The entire assembly of parts forming the present take-up mechanism is simple and inexpensive and experience has proven its value in service. I desire, therefore, that protection should be accorded as defined by the claims following in which are set forth the essentials or principles of this invention.

I claim:

1. The combination with a bolt and a nut of interengaging screw threads having a pitch such that the nut may be advanced rotatively upon the bolt by an end thrust upon the former, and automatic take-up mechanism associated with the nut comprising means freely rotatable upon the bolt and secured thereto a fixed distance from the nut, and a spring interposed between said means and the nut and exerting thereupon opposite end pressures, substantially as described.

2. The combination with a nut and a bolt having interengaging screw threads of means independent of said threads loosely carried by the nut and in engagement with the bolt threads, a spring exerting thrust on said means in a direction counter to the resistance of the work with which the nut is engaged whereby the threads of the nut and said means loosely carried thereby are engaged with opposite faces of the bolt threads, substantially as described.

3. In combination, a bolt and a nut having interengaging square cut screw threads, means separate from the nut and carried thereby also in engagement with the bolt threads, a compression spring exerting thrust against said means whereby a force is directed against a face of the bolt threads opposite to the force proceeding from the work through the nut against the same bolt threads, and means carried by the bolt freely rotatable thereupon and receiving from the spring an opposing thrust, and adapted to turn with the spring when the latter is expanded or contracted, substantially as described.

4. The combination with a bolt and nut having interengaging screw threads, of a compression spring exerting an endwise pressure on the nut and freely rotatable relative thereto, the screw threads of the nut and bolt being inclined at a pitch sufficiently steep to permit rotative advancement of the nut in response to pressure of the spring directed endwise of the nut, substantially as described.

5. The combination of a bolt having screw threads extending to a point short of one end thereof, means secured to said bolt end in a manner to rotate freely thereupon, a nut having screw threads for co-operation with those of the bolt, a collar associated with the nut and having inwardly extending means for engaging with the bolt threads, and a spring coiled about the nut with one end exerting pressure upon the collar thereof and its other end exerting a thrust pressure against the freely rotatable means adjacent the bolt end, the co-operating screw threads of the nut and bolt being so pitched as to permit the nut to advance rotatably upon the bolt in response to pressure exerted by the spring upon the collar, the nut threads and means extended inwardly from the collar exerting pressure upon opposite faces of the bolt threads, substantially as described.

6. In combination with a screw threaded bolt having at one end thereof means connected thereto by anti-friction devices for free rotation upon the bolt, a nut having co-operating screw threads adapted to be rotatively advanced upon the bolt, and a spring coiled about the bolt and exerting opposite pressures upon the nut and freely rotatable means of the bolt, the screw threads of the nut and bolt being so pitched as to permit the nut to advance in response to an end pressure exerted thereupon by the spring, substantially as described.

7. In combination, a screw threaded bolt, a nut having co-operating screw threads adapted to be rotatively advanced upon the bolt, one end of the nut having a friction surface for engaging non-rotatably with the work, thrust means having a freely rotatable mounting on the bolt, and a spring interposed between said thrust means and the nut adapted to direct against the latter a longitudinal force, the pitch of the screw threads being such that the nut is advanced rotatively in response to the force of said thrust means, substantially as described.

JOHN A. ANDERSON.